M. F. WALSH.
REAR SIGNAL FOR VEHICLES.
APPLICATION FILED NOV. 21, 1912.
1,108,036.
Patented Aug. 18, 1914.
3 SHEETS—SHEET 1.
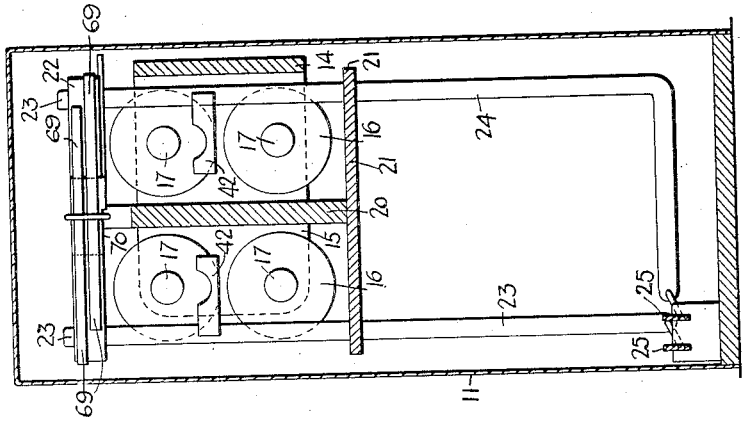
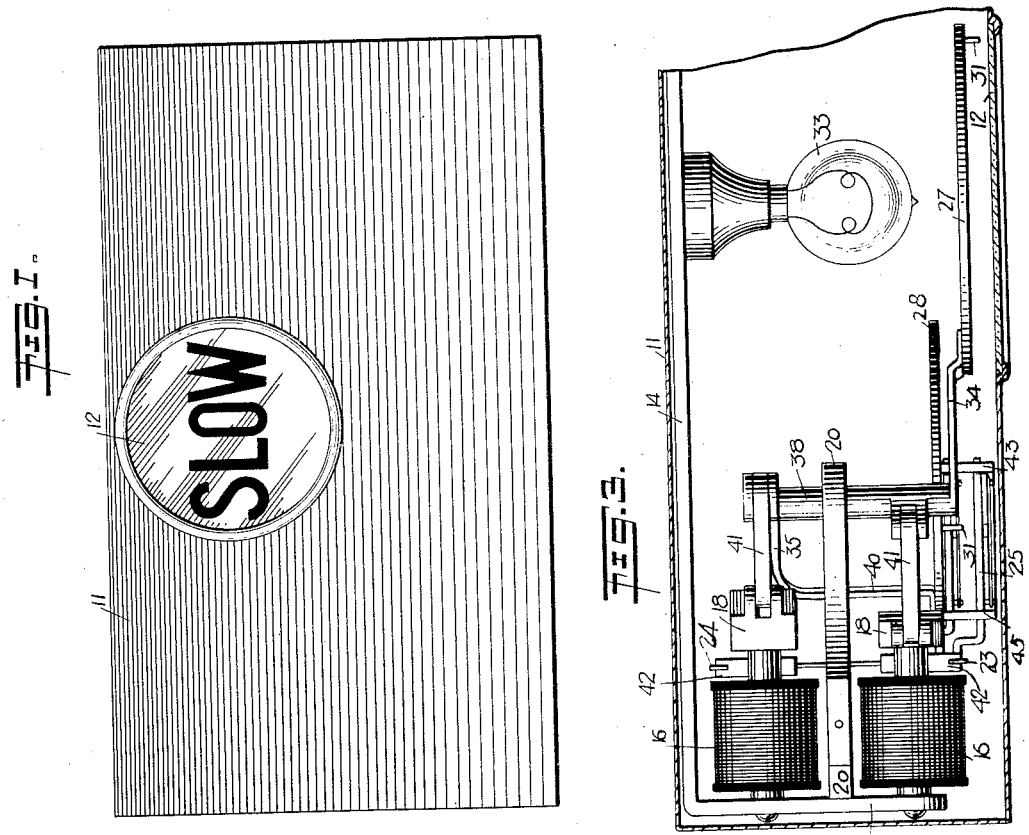
WITNESSES
G. Robert Thomas
INVENTOR
MICHAEL F. WALSH,
BY Munn & Co
ATTORNEYS

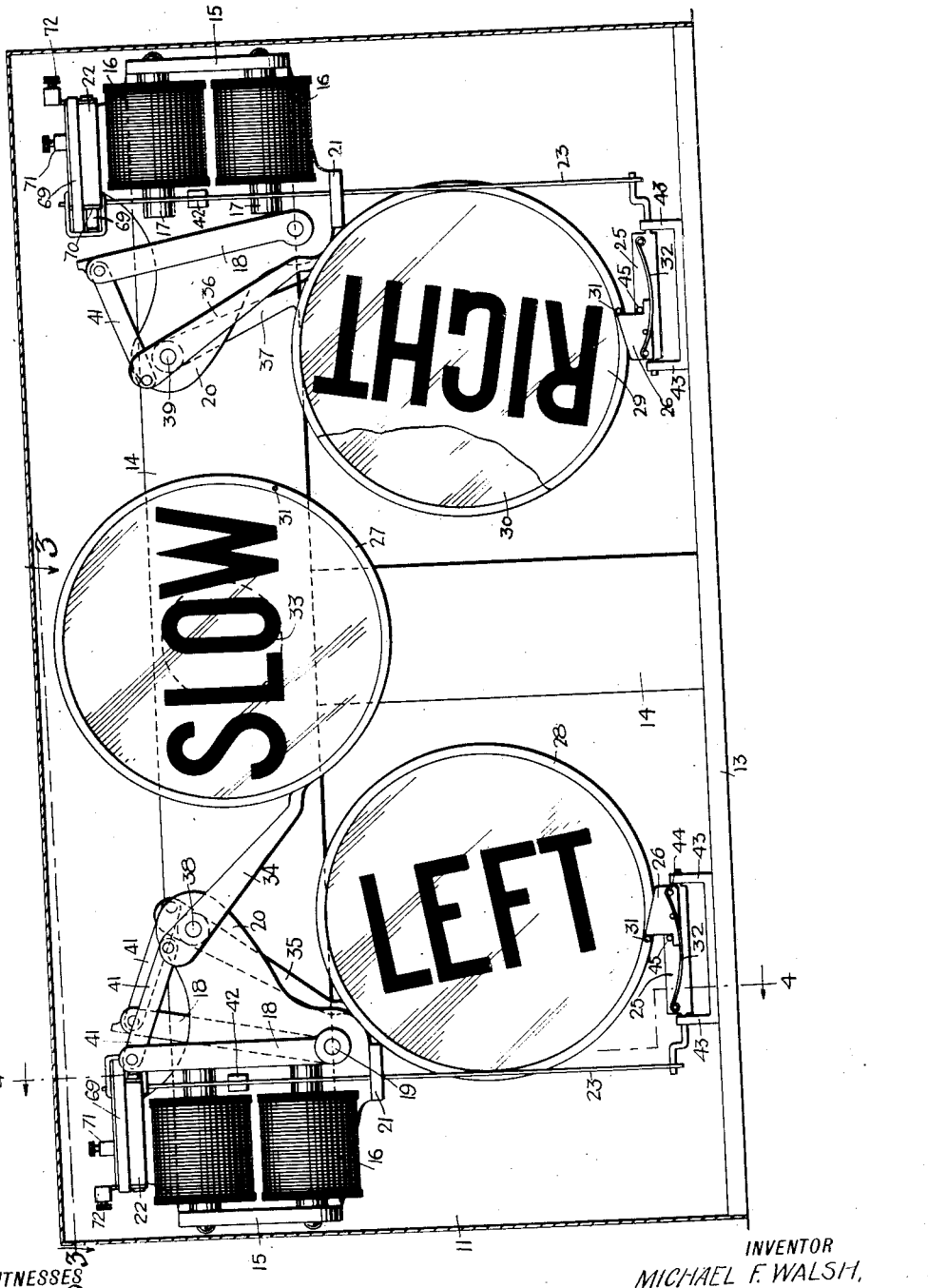

M. F. WALSH.
REAR SIGNAL FOR VEHICLES.
APPLICATION FILED NOV. 21, 1912.

1,108,036.

Patented Aug. 18, 1914.
3 SHEETS—SHEET 3.

WITNESSES
G. Robert Thomas
C. S. Murdock

INVENTOR
MICHAEL F. WALSH,
BY Munn & Co
ATTORNEYS

UNITED STATES PATENT OFFICE.

MICHAEL F. WALSH, OF NEW YORK, N. Y.

REAR SIGNAL FOR VEHICLES.

1,108,036.

Specification of Letters Patent. Patented Aug. 18, 1914.

Application filed November 21, 1912. Serial No. 732,711.

*To all whom it may concern:*

Be it known that I, MICHAEL F. WALSH, a citizen of the United States, and a resident of the city of New York, borough of Brooklyn, in the county of Kings and State of New York, have invented a new and Improved Rear Signal for Vehicles, of which the following is a full, clear, and exact description.

Among the principal objects which the present invention has in view are: to provide a signal apparatus readable at the rear of a vehicle to show the purpose of the driver of the vehicle; to provide an operating mechanism for a signal, which is simple and efficient; and to provide operating means for the apparatus, to avoid interference of the various signal devices, and to secure a desired precedence of the signals.

Reference is to be had to the accompanying drawings forming a part of this specification, in which similar characters of reference indicate corresponding parts in all the views, and in which—

Figure 5:
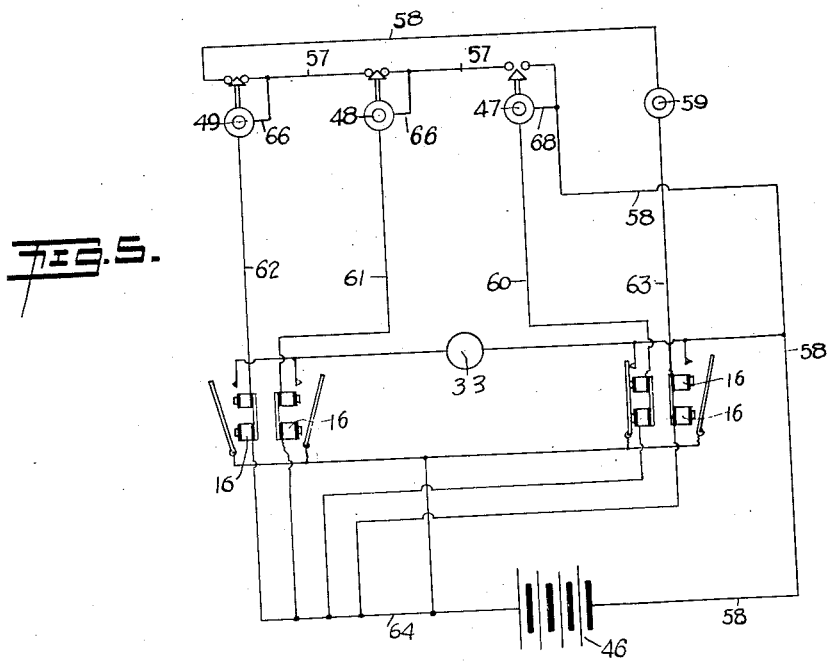
Figure 6:
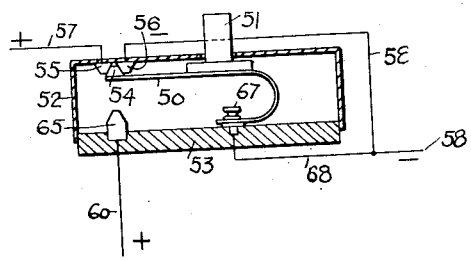

Figure 1 is a face view of the apparatus employed by me; Fig. 2 is a vertical longitudinal section of the containing case for the apparatus, showing in side elevation the operating parts of the apparatus; Fig. 3 is a horizontal cross section taken on the line 3—3 in Fig. 3, showing a fragment of the containing case, showing a top view of a portion of the operating members of the apparatus; Fig. 4 is a vertical cross section of the apparatus, taken on the line 4—4 in Fig. 2; Fig. 5 is a diagrammatic view showing the switches and electric circuits for operating the apparatus; Fig. 6 is a detail view in vertical section, showing in detail one of the operating switches.

As seen in the accompanying drawings, a containing case 11 is provided, it being intended that said case shall be permanently mounted at the rear of an automobile or other vehicle in position to be seen by the drivers of following vehicles. The case is furnished with a view opening, normally covered by a transparent glass 12. Upon the bottom 13 of the case is mounted a supporting frame 14, having lateral extensions 15 disposed to support in parallel arrangement the magnets 16, which, as shown in the drawings, are mounted in vertical couples serially wound. The cores 17 of the various magnets are suitably disposed in line with levers 18, said levers being each mounted on a shaft 19 supported upon, and laterally extended from, brackets 20.

The brackets 20 are both rigidly mounted upon the extensions 15 of the frame 14, and are provided each with a lower guide shelf 21 and an upper guide shelf 22. The guide shelves 21 and 22 are each suitably perforated to receive latch-operating rods 23 and 24. The rods 23 and 24 are provided to rock plates 25, which are furnished as supports for latch heads 26. The latch heads 26 are provided to retain in out-of-service position targets 27, 28, 29 and 30, for which purpose each of the brackets is provided with a stop pin 31 to override the inclined surfaces of said latch heads, springs 32 with which each of the latch heads is provided, yielding to accommodate this movement on the part of the targets and the stop pins 31 thereof.

There are four targets 27, 28, 29 and 30 provided, each having a word printed thereon. The targets are constructed of any suitable transparent material, preferably celluloid, to permit the light of an electric lamp 33 to pass therethrough. Upon each of the targets is printed a word indicative of the intent of the driver of the vehicle upon which the apparatus is mounted.

As shown in the accompanying drawings, the target 27 has imprinted thereon the word "Slow." The target 28 carries the word "Left"; the target 29 carries the word "Right;" and the target 30 carries the word "Stop." This is not shown in the drawings, being obscured by the target 29 in Fig. 2 of the drawings.

The service position of each of the targets is that where the target is raised in line with the glass 12 or view opening of the case 11, as shown in Fig. 1 of the drawings, where the target 27 is exposed behind the glass 12. Each of the targets is thus raised by one of the magnets 16, one of said magnets being assigned to each of said targets. The targets are supported by arms 34, 35, 36 and 37. The arms 34 and 35 are each mounted upon a shaft 38 at one side of the case 11. The arms 36 and 37 are pivotally mounted on a shaft 39 at the opposite side of the case. The shafts 38 and 39 are each mounted in one of the brackets 20. The arms 35 and 37 are each provided with a forwardly-extended portion 40, to hold the targets 28 and 30 in planes juxtaposed to the planes in which operate the targets 27 and 29.

The arms 34, 35, 36 and 37 are each connected by rods 41, to one of the levers 18. The levers 18, it will be understood, serve as armatures for the various magnets 16, in the plane of the cores 17 whereof said levers swing.

From the foregoing, it will be seen that when any one of the magnets 16 is energized, the lever 18 corresponding thereto and in front of the cores 17 thereof, is drawn against the cores; rocking on the shaft 19, the free end of the lever 18 draws the short end of the arm 34, 35, 36 or 37, as the case may be, rocking said arm upon the shaft 38 or 39. Coincident with this action of the lever 18, one of the rods 23 is lifted by the pull of the upper magnet upon a block 42. Each rod 23 has rigidly mounted thereon one of the blocks 42. The blocks 42 are normally disposed in closer approximation to the upper of the magnet couples, to be influenced by the core of said upper magnet. With the lift of any of the rods 23, the connected plate 25 is rocked in bearings provided therefor in standards 43. By thus rocking any of the plates 25, the latch head 26 connected therewith is removed from engagement with the pin 31 on the corresponding target. The target being thus released, the pull of the levers 18 on the short end of the arm supporting the selected target moves the long end of said arm and target connected therewith into service position, where the target is interposed between the glass 12 and the lamp 33. The above position is maintained while the electric circuit energizing the holding magnet is maintained. When the circuit is broken, the magnet becomes deënergized, to release the block 42 and rod 23 connected therewith to return the plate 25 and latch head 26 to their normal position prior to the target dropping into out-of-service position. When the target thus drops, the weight carries the pin 31 over the latch head 26, the spring 32 yielding to permit the depression of said latch head, the same swinging on its pivot 44. The spring 32 operates to lift the free end of the latch head until arrested by a stop pin 45, as seen best in Fig. 2 of the drawings.

There being four targets, it becomes necessary that provision be made to avoid placing two targets in service position at any one time. It is to avoid this that I provide a series of operating electric circuits, each circuit incorporating one of said magnet couples and a battery or other electric source 46.

Incorporated on three of the four circuits are switches, constructed substantially as shown in Fig. 6 of the drawings. In Fig. 5 of the drawings, these switches are designated 47, 48 and 49. Each of the three above-mentioned switches is provided with a spring contacting member 50. The member 50 supports a button 51, which is extended through a box casing 52, to the bottom 53 of which one end of the member 50 is fixedly connected. The member 50 is provided at its forward end with a wedge 54, to extend between terminal blocks 55 and 56. The blocks 55 and 56 form the terminals of short branches 57 extending between the switches 47 and 48, and 48 and 49, which branches also constitute a portion of the common return 58 of the operating electric circuit. This circuit is best traced by starting from the switch 59, which is the fourth unit of the controlling switches. Each of said switches 47, 48, 49 and 59 is connected by wires 60, 61, 62 and 63 with the circuit lead wire 64 from the opposite side of the battery 46 to that connected with the return 58.

Incorporated upon each of the wires 60 to 63 inclusive is one of the magnets 16. By this arrangement when the driver depresses the button 51 on any of the switches 47, 48, 49 or 59, the circuit incorporating one of the magnets 16 and the battery 46 is completed by the free end of the member 50 impinging upon the terminal block 65 mounted upon the bottom 53 of the box casing 52. In thus depressing one of the members 50, the wedge 54 is withdrawn from between the terminal blocks 55 and 56 associated therewith. This breaks the return circuit for certain of the switches, or those farther removed from the battery than the particular switch so operated.

The purpose in breaking the return 58 by the use of the branches 57 is to insure against the possibility of placing two targets in service position simultaneously, and to secure the desired precedence in the use of the said targets. Thus the wedge 54, when removed from the blocks 55 and 56 in any particular switch, serves to cut out the succeeding switches and their controlled magnets. To avoid cutting out the operating switch, the switches 48 and 49 are provided with branches 66, connecting the binding post 67 in each of said switches with one of the branches 57. The binding post 67 of the switch 47 is connected to the return 58 by a branch 68. When thus wired, it will be observed that, if the operator depresses the button 51 on the switch 47, the magnet 16 on the wire 60 is energized when the end of the spring member 50 impinges upon the block 65 to close the circuit. Coincident with the depression of the spring member 50 of the switch 47, the wedge 54 connected with the same spring is removed from the blocks 55 and 56 of the switch 47. By means of the branch 68, it will be observed, the circuit is maintained through the switch 47, the wire 60, battery 46, and the return 58, but it will also be observed that the circuit is broken and cannot be closed by the operation of the switches 48, 49 or 59. This condition of the circuits is shown in Fig. 5 of the drawings.

The target 30 having the word "Stop" printed thereon is controlled by the switch 47, and in mounting the system on an automobile or other vehicle where the brake is controlled by the foot, the switch 47 is usually disposed adjacent said brake, in position to be operated by the heel of the operator when operating the brake. The operation of the brake may be an emergency application, and the driver may overlook the fact that he may be at that moment with his other foot holding the left or slow targets in operative position. Due to the particular wiring above described, however, when the switch 47 is operated, the circuit previously established for operating any of the three other targets is broken by the removal of the wedge 54 from between the blocks 55 and 56 at the switch 47. The next target in importance is the target 27 having the word "Slow" printed thereon. The switch 48 controlling this target is usually located adjacent the clutch, or the pedal, of the automobile controlling the supply of gas or explosive fuel. It will be observed that, while the circuit controlled by the switch 48 can only be effective when the switch 47 is not being used, the operation of the switch 48 breaks the circuit for the switch 49 and the switch 59, neither of which can be operated while either the switch 48 or the switch 47 is in operative position.

The switches 49 and 59 control the targets 28 and 29, to indicate the intention to turn to the left or right. Of these two targets, the most important is that indicating the left turn, for the obvious reason that under usual conditions the vehicle has nothing to fear from following vehicles endeavoring to pass on the right side, the law of the road compelling the passage of a following vehicle on the left of the vehicle ahead. It is for this reason that the switch 49 breaks the circuit which would otherwise be closed by the switch 59 when operated. Thus, from the foregoing it will be seen that if the driver has operated either of the switches 48, 49 or 59, to place in service position the target indicating slow, left or right, the operation of the switch 47 serves to drop the target previously set, while setting in front of the lamp 33 the target 30 having imprinted thereon the word "Stop."

By the above arrangement of the circuits controlling the various targets, possibility of confusion arising from the setting of two targets, is avoided.

The circuits for the lamp 33 are broken. They are closed only when one of the levers 18 impinges upon one of the flexible contact springs 69. The springs 69 are rigidly mounted upon the upper shelf 22, as best seen in Fig. 2 of the drawings. The free ends of the springs 69 are adapted to impinge upon a terminal plate 70, also rigidly mounted on the shelf 22. The plate 70 is provided with a binding post 71, to which one terminal of the circuit incorporating the lamp 33 is connected. The other terminal of the lamp 33 is connected with the binding post 72.

From the above it will be seen that the lighting circuit of the lamp 33 operates only when one of the targets is in service position. In this manner, the electric current is conserved.

Having thus described my invention, I claim as new and desire to secure by Letters Patent:—

1. A signal, having a plurality of targets pivotally mounted and adapted for movement to a common view-point; a plurality of electro-mechanical devices for moving said targets to said view-point; a plurality of electric circuits, each incorporating one of said devices; an electric source supplying all of said circuits; a plurality of manually-operable switches, each being arranged to complete one of said circuits; a common element for said circuits intermediate all of said switches and said electric source; and a plurality of make-and-break members mounted on said common element between said switches and electric source, said make-and-break members embodying separated terminal members and means for connecting the same, said means being each operatively connected with one of said switches.

2. A signal as characterized, embodying a plurality of targets movable to a common view-point, each of said targets having a direction symbol impressed thereon, said symbols being arranged in series, said series corresponding progressively to the order of importance of said symbols; a plurality of electro-mechanical apparatuses for moving said targets adjacent said view-point, said apparatuses incorporating each a manually-operated circuit-closing member; and means connected with each of said circuit-closing members for opening the operating circuits controlling the targets having symbols of relatively less importance.

In testimony whereof I have signed my name to this specification in the presence of two subscribing witnesses.

MICHAEL F. WALSH.

Witnesses:
E. F. MURDOCK,
PHILIP D. ROLLHAUS.